(12) United States Patent
Minato (10) Patent No.: US 11,494,974 B2
(45) Date of Patent: Nov. 8, 2022

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Yoshihiko Minato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/329,438

(22) Filed: May 25, 2021

(65) Prior Publication Data

US 2021/0398341 A1    Dec. 23, 2021

(30) Foreign Application Priority Data

Jun. 18, 2020    (JP) .............................. JP2020-105422

(51) Int. Cl.
*G06T 15/20*    (2011.01)
(52) U.S. Cl.
CPC .................................... *G06T 15/20* (2013.01)
(58) Field of Classification Search
None
See application file for complete search history.

(56) References Cited

U.S. PATENT DOCUMENTS

| | | | |
|---|---|---|---|
| 10,044,985 B1* | 8/2018 | Parker | H04N 5/22541 |
| 2018/0234669 A1* | 8/2018 | Chen | H04N 13/221 |
| 2021/0241518 A1* | 8/2021 | Tong | G06K 9/00771 |

FOREIGN PATENT DOCUMENTS

JP    2008-262392 A    10/2008

* cited by examiner

*Primary Examiner* — Frank S Chen
(74) *Attorney, Agent, or Firm* — Carter, DeLuca & Farrell LLP (57) ABSTRACT

An information processing apparatus comprising: a setting unit configured to set a plurality of key frames each representing a virtual camera parameter including a position and orientation of a virtual camera used for generating a virtual viewpoint image based upon a plurality of captured images obtained by image capture performed by a plurality of image capture apparatuses; and a determination unit configured to determine, based upon a virtual camera parameter of a first key frame and a virtual camera parameter of a second key frame adjacent to the first key frame among the plurality of key frames, an interpolation method of the virtual camera parameter between the first key frame and the second key frame.

11 Claims, 11 Drawing Sheets

| Key Frame | Time Code | X | Y | Z | Pan | Tilt | Role | Zoom |
|---|---|---|---|---|---|---|---|---|
| KF1 | 00:00:01;05 | 1.0m | 3.0m | 1.0m | 0° | 0° | 0° | 6mm |
| KF2 | 00:00:02;05 | 3.0m | 1.0m | 1.0m | 30° | 0° | 0° | 6mm |
| KF3 | 00:00:04;14 | 7.0m | 2.0m | 1.0m | 90° | 0° | 0° | 6mm |
| KF4 | 00:00:08;20 | 7.0m | 2.0m | 1.0m | 90° | 0° | 0° | 6mm |

F I G. 14

| Key Frame | Time Code | X | Y | Z | Pan | Tilt | Role | Zoom |
|---|---|---|---|---|---|---|---|---|
| KF1 | 00:00:01;05 | 1.0m | 3.0m | 1.0m | 0° | 0° | 0° | 6mm |
| KF2 | 00:00:02;05 | 3.0m | 1.0m | 1.0m | 30° | 0° | 0° | 6mm |
| KF3 | 00:00:04;14 | 7.0m | 2.0m | 1.0m | 90° | 0° | 0° | 6mm |
| Add_KF | 00:00:04;15 | 7.0m | 2.0m | 1.0m | 90° | 0° | 0° | 6mm |
| KF4 | 00:00:08;20 | 7.0m | 2.0m | 1.0m | 90° | 0° | 0° | 6mm |

INFORMATION PROCESSING APPARATUS, METHOD OF CONTROLLING INFORMATION PROCESSING APPARATUS, AND STORAGE MEDIUM

BACKGROUND

Field

The present disclosure relates to an information processing apparatus, a method of controlling an information processing apparatus, and a storage medium, and particularly relates to technology of editing a camera path of a virtual viewpoint image or a CG animation.

Description of the Related Art

Technology of synchronously capturing an image of an identical target of imaging (object) by a plurality of image capture apparatuses installed at different positions, and generating, by using an obtained multi-viewpoint image, a virtual viewpoint image that is an image from a viewpoint (virtual viewpoint) of a virtual camera that actually does not exist and that is virtually disposed in a three-dimensional space has attracted attention. According to such technology of generating a virtual viewpoint image from a multi-viewpoint image, for instance, a highlight scene of soccer or basketball can be viewed from various angles, and thus high realistic sensation can be given to a viewer, as compared to a normal image.

Japanese Patent Laid-Open No. 2008-262392 discloses correcting reference camera work including time-series field-of-view information of a virtual camera virtually disposed in a three-dimensional space, by using correction data with respect to the field-of-view information.

A virtual camera path representing transition of a virtual viewpoint can be generated by a key-frame method including setting a plurality of key frames each representing a state of a virtual viewpoint at a specific time point, and interpolating between the plurality of key frames. However, when a virtual camera path is generated by uniformly interpolating between key frames according to spline interpolation or the like, there are instances where a virtual viewpoint moves in a manner unintended by a user. For instance, in a case where it is intended to keep a virtual viewpoint still, even when a plurality of key frames having different time are set at an identical position, there are instances where the virtual viewpoint moves between those key frames.

The present disclosure has been made in view of the above-described problems, and provides technology of generating a virtual camera path intended by a user in virtual camera path generation using key frames.

SUMMARY

According to one aspect of the present disclosure, there is provided an information processing apparatus comprising: a setting unit configured to set a plurality of key frames each representing a virtual camera parameter including a position and orientation of a virtual camera used for generating a virtual viewpoint image based upon a plurality of captured images obtained by image capture performed by a plurality of image capture apparatuses; and a determination unit configured to determine, based upon a virtual camera parameter of a first key frame and a virtual camera parameter of a second key frame adjacent to the first key frame among the plurality of key frames, an interpolation method of the virtual camera parameter between the first key frame and the second key frame.

Further features of the present disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the present disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Hardware Configuration of Information Processing Apparatus

Figure 1:
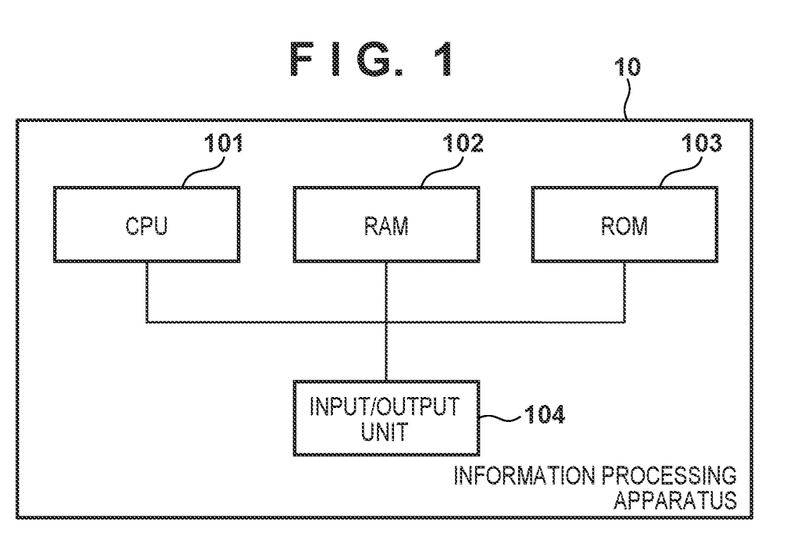
FIG. 1 is a figure illustrating an example of a hardware configuration of an information processing apparatus related to an embodiment.

FIG. 1 is a figure explaining a hardware configuration of an information processing apparatus 10 related to a first embodiment. The information processing apparatus 10 is provided with a CPU 101, a RAM 102, a ROM 103, and an input/output unit 104.

The CPU 101 controls the information processing apparatus 10 as a whole by using a computer program or data stored in the RAM 102 or the ROM 103. Note that the information processing apparatus 10 may include one or more types of dedicated hardware or a Graphics Processing Unit (GPU) that are different from the CPU 101, and at least a portion of processing by the CPU 101 may be performed by the GPU or the dedicated hardware. Examples of the dedicated hardware include an Application Specific Integrated Circuit (ASIC), and a Digital Signal Processor (DSP).

The RAM 102 temporarily stores a computer program or data read out from the ROM 103, data externally supplied via the input/output unit 104, or the like. The ROM 103 holds a computer program or data that requires no modification. The input/output unit 104 perform input and output of data to and from a controller for editing a camera path, a display that displays a GUI, or the like. Note that the input/output unit 104 may include a controller, a display, or the like.

Functional Configuration of Information Processing Apparatus

Figure 2:
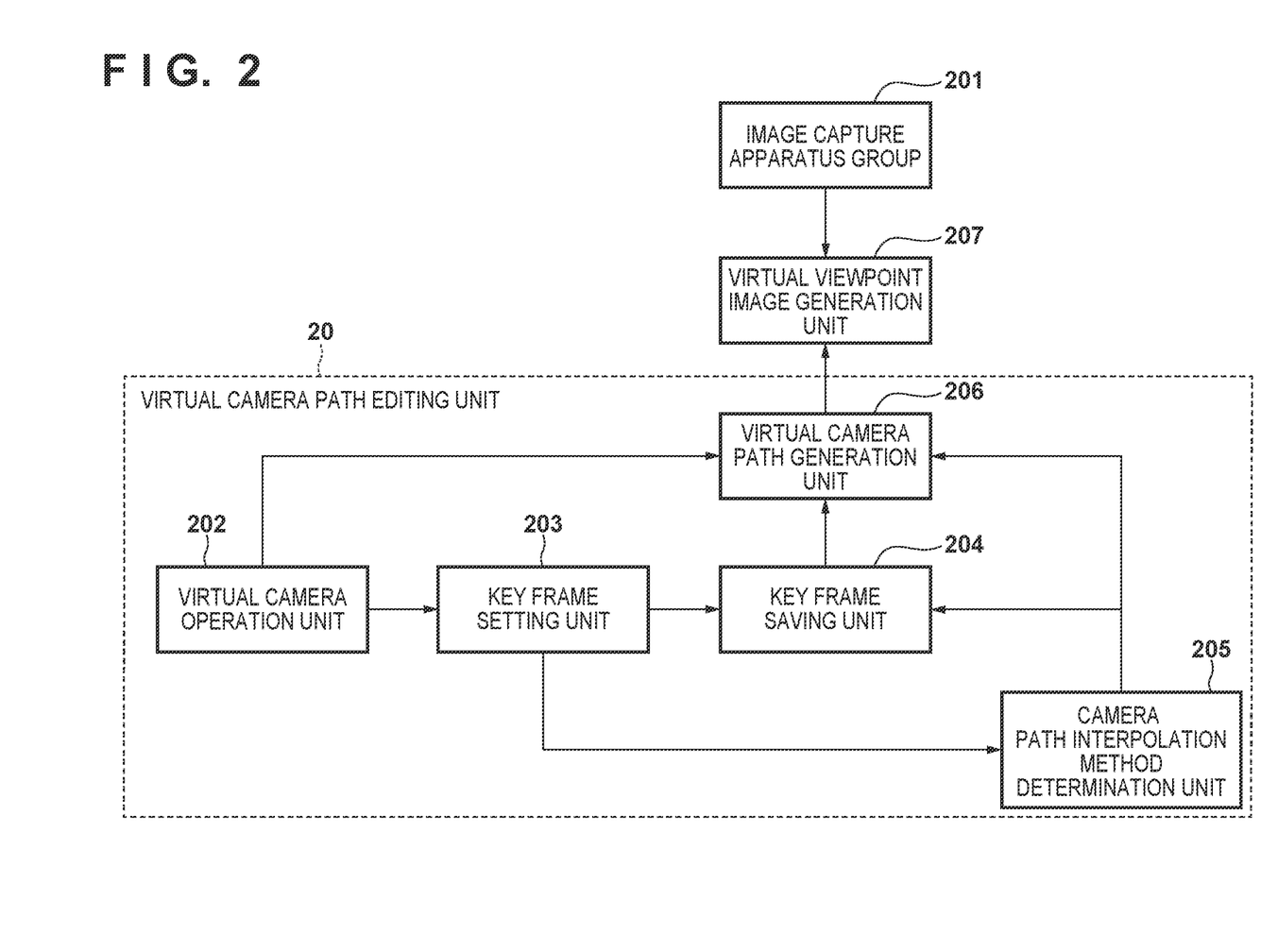
FIG. 2 is a figure illustrating an example of a functional configuration of an information processing apparatus related to a first embodiment.

FIG. 2 is a figure illustrating an example of a functional configuration related to virtual camera path generation of the information processing apparatus 10 related to the first embodiment. The information processing apparatus 10 generates a virtual camera path by interpolating a plurality of key frames that become a reference of the virtual camera path indicating a trajectory of positions of a virtual camera. Each of the key frames represents a state of the virtual camera at specific time. The information processing apparatus 10 includes a virtual camera path editing unit 20. Note that the information processing apparatus 10 may further include a virtual viewpoint image generation unit 207.

The virtual camera refers to a camera that is virtual and that is different from a plurality of image capture apparatuses actually installed nearby an imaging region, and is a concept for conveniently explaining a virtual viewpoint related to generation of a virtual viewpoint image. That is, the virtual viewpoint image can be regarded as an image captured from the virtual camera set within a virtual space associated with the imaging region. Then, a position of a viewpoint and a view direction from a virtual viewpoint in the image capture that is virtual can be represented as a position and orientation of the virtual camera. In other words, in a case where it is assumed that a camera exists at a position of a virtual viewpoint set in a space, the virtual viewpoint image can be said to be an image simulating a captured image obtained from that camera. Additionally, in the present embodiment, contents of temporal transition of a virtual viewpoint are expressed as a virtual camera path. However, it is not essential to use the concept of the virtual camera to realize the configuration of the present embodiment. That is, it suffices to set at least information representing a specific position in a space and information representing a specific direction in a space, and to generate a virtual viewpoint image in accordance with the set information.

In the present embodiment, it is assumed that in the key frame, viewpoint information representing a position of a virtual viewpoint and a view direction from a virtual viewpoint is associated with time information corresponding to time of a virtual viewpoint image. It can be said that the viewpoint information is a virtual camera parameter representing a position and orientation of the virtual camera. Additionally, the time information may be reproduction time of a virtual viewpoint image reproduced as video, or may be time corresponding to image capture time of a captured image used for generation of a virtual viewpoint image.

The virtual camera path editing unit 20 is provided with a virtual camera operation unit 202, a key frame setting unit 203, a key frame saving unit 204, a camera path interpolation method determination unit 205, and a virtual camera path generation unit 206.

The virtual camera path editing unit 20 controls the virtual camera and determines a parameter set (also referred to as a virtual camera parameter below) including a sequence of parameters of the virtual camera and constituting a virtual camera path. The virtual camera parameter may include a parameter for specifying at least any one of a position, orientation, zoom or time.

The position of the virtual camera specified by the virtual camera parameter may indicate three-dimensional coordinates. Additionally, the position of the virtual camera specified by the virtual camera parameter may be indicated by coordinates of an orthogonal coordinate system of three axes of an X axis, a Y axis and a Z axis. In this case, the position of the virtual camera specified by the virtual camera parameter indicates the coordinates, and may include parameters of the three axes of the X axis, the Y axis and the Z axis. Note that origin may be any position within a three-dimensional space.

The orientation of the virtual camera specified by the virtual camera parameter may be indicated by an angle formed by three axes of a pan, a tilt and a roll. In this case, the orientation of the virtual camera specified by the virtual camera parameter may include parameters of the three axes of the pan, the tilt and the roll.

The zoom of the virtual camera specified by the virtual camera parameter is indicated, for instance, by one axis of the focal length. The zoom and the time are each a parameter of one axis. Accordingly, the virtual camera parameter of the virtual camera can include parameters of at least six axes including the parameters of the three axes of the X axis, the Y axis and the Z axis, and the parameters of the three axes of the pan, the tilt, and the roll. Then, the virtual camera parameter of the virtual camera can include parameters of eight axes further including the parameters of the one axis of the zoom and the one axis of the time.

The virtual camera path editing unit 20 can control the parameters of these eight axes. Note that the virtual camera parameter may include parameters defining other elements, or may not include some of the parameters of the eight axes described above. The virtual camera path editing unit 20 transmits the determined virtual camera parameter set including a sequence of virtual camera parameters to the virtual viewpoint image generation unit 207. Next, the virtual viewpoint image generation unit 207 generates a virtual viewpoint image, based upon the received virtual camera parameters of a camera path.

Here, the virtual camera path operation unit 202 accepts operation control of the virtual camera by a virtual camera operator, and outputs the control result to the virtual camera path generation unit 206 and the key frame setting unit 203 as a virtual camera parameter. Here, the virtual camera parameter includes a parameter indicating at least the position and the orientation (direction) of the virtual camera. However, the virtual camera parameter is not limited to this parameter, and may include, for instance, a parameter indicating an angle of view of the virtual camera.

The key frame setting unit 203 sets the key frame, based upon the virtual camera parameter input from the virtual camera operation unit 202, and key frame setting information (information indicating whether or not to set as the key frame, information indicating whether or not to save the key frame). Then, the set key frame is output to the key frame saving unit 204 and the camera path interpolation method determination unit 205.

The key frame saving unit 204 saves the key frame set by the key frame setting unit 203. Additionally, the saved key frame is output to the virtual camera path generation unit 206.

The camera path interpolation method determination unit 205 determines whether or not the key frame output from the key frame setting unit 203 satisfies a predetermined condition, and determines a camera path interpolation method corresponding to this, and outputs the determined camera path interpolation method to the virtual camera path generation unit 206. Details of the predetermined condition will be described below. Additionally, the camera path interpolation method determination unit 205 adds the key frame as necessary and saves the added key frame in the key frame saving unit 204.

The virtual camera path generation unit 206 generates a virtual camera path by using the virtual camera parameter output from the virtual camera path operation unit 202, or by interpolating between at least two key frames saved in the key frame saving unit 204. Here, the virtual camera path is represented by temporally consecutive virtual camera parameters. When the virtual camera path generation unit 206 generates a virtual camera path, the virtual camera path generation unit 206 associates the virtual camera path with a time code such that which frame is based upon which parameter can be identified.

An image capture apparatus group 201 includes a plurality of cameras installed to surround a game field or the like, and performs synchronous image capture, and also outputs a captured image to the virtual viewpoint image generation unit 207.

The virtual viewpoint image generation unit 207 generates a three-dimensional model from the image captured by the image capture apparatus group 201. Then, a virtual viewpoint image is generated by mapping texture at a virtual viewpoint (the position and the orientation of the virtual camera, and the angle of view of the virtual camera) in the virtual camera path generated by the virtual camera path generation unit 206.

Note that the information processing apparatus 10 related to the present embodiment can also be used for editing a camera path of a CG image. In that case, a CG renderer is provided in place of the virtual viewpoint image generation unit 207. The virtual camera represents a viewpoint of the CG image, and can move to any position within a CG space.

Explanation of Virtual Camera Path

The virtual camera path refers to a path defining movement of the virtual camera in video created by sequentially reproducing a plurality of virtual viewpoint images or a plurality of CG images. This virtual camera path is managed by a frame and a time line. The frame holds information required for generating each image constituting video. Specifically, the frame holds, for instance, information of time (time code) of a scene, and information of a position and orientation of a camera. The time of a scene can be represented by, for instance, a time code having starting time of a game to be captured of a 00-hour, 00-minute and 00-second frame. The position of the virtual camera is represented by, for instance, three coordinates of X, Y and Z with origin set within an image capture space. The orientation of the virtual camera is represented by, for instance, three angles of a pan, a tilt and a roll. The number of the frames included in the time line is determined according to the number of images reproduced per second (frame rate). For instance, in a case where the frame rate is 60 frames per second, 60 frames per second are included in the time line.

In virtual camera path edition using the key frame, two types of frames of the key frame and an intermediate frame exist in the frame. The key frame is a frame that a virtual camera operator editing the virtual camera path uses to explicitly specify information. On the other hand, the intermediate frame is a frame between the key frames, and is a frame that the virtual camera path editing unit 20 uses to determine information by interpolating between the key frames.

Figure 4:
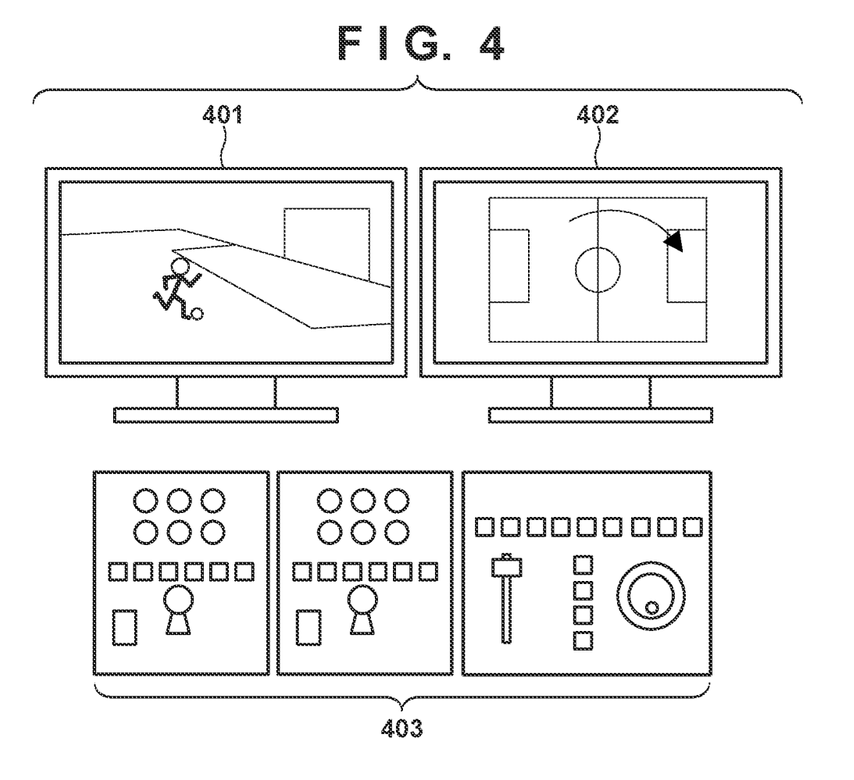
FIG. 4 is a schematic view explaining a UI for editing a camera path related to the first embodiment.

Here, FIG. 4 illustrates an example of a User Interface (UI) that edits the virtual camera path. A virtual camera image display unit 401 displays an image generated by the virtual viewpoint image generation unit 207, that is, an image viewed from the virtual camera. A GUI display unit 402 displays information regarding the camera path and the key frame, or the like. A camera path edition controller 403 is a controller used by a user (virtual camera operator) for editing the camera path.

Note that the virtual camera path editing unit 20 always transmits, to the virtual viewpoint image generation unit 207, information of the frame that is to be edited by a user. The virtual viewpoint image generation unit 207 generates a virtual viewpoint image, based upon the received information of the frame. The generated virtual viewpoint image is transmitted to the virtual camera image display unit 401, and the virtual camera image display unit 401 displays the generated virtual viewpoint image. Accordingly, a user can edit the camera path while confirming the image viewed from the virtual camera of the frame that is to be edited.

Explanation of Problem

Here, a problem in the present embodiment will be explained in detail by referring to FIGS. 3 and 13. In creation of an image clip such as a replay, there are instances where a temporal margin is created before and after the image clip and edition is facilitated. When there is lack of this temporal margin, there is also a problem of lack of time for a viewer to recognize a scene. In a relay of a sport or the like, there are instances where CG images are superimposed and inserted before and after a replay by using time of this margin. At this time, it is intended to keep the position and the orientation of the virtual camera in an identical state (equilibrium state) and to cause time to elapse.

Figure 3A:
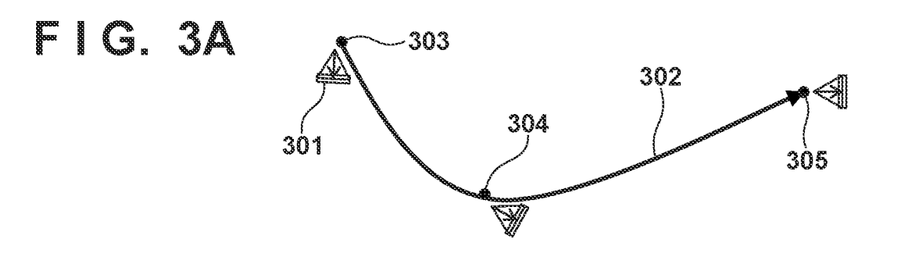
FIGS. 3A and 3B are figures explaining a problem related to the first embodiment.
Figure 3B:
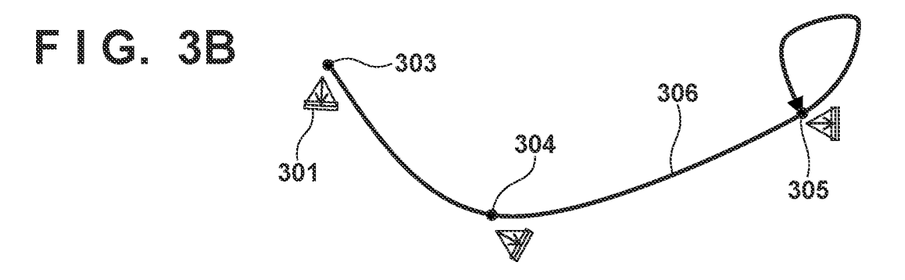

In FIG. 3A, a virtual camera 301 is illustrated. Key frames 303, 304 and 305 indicated by dots are the key frames set by the key frame setting unit 203. A virtual camera path 302 indicated by a solid line indicates the virtual camera path.

A virtual camera operator controls the virtual camera operation unit 202 and, in a desired time code, determines the position and the orientation of the virtual camera and sets the position and the orientation of the virtual camera as the key frame. Those set as the key frames by the key frame setting unit 203 are listed as indicated in the table of FIG. 13. Each time the key frame is set, the key frame is added in the table in order of the time code.

Figure 13:
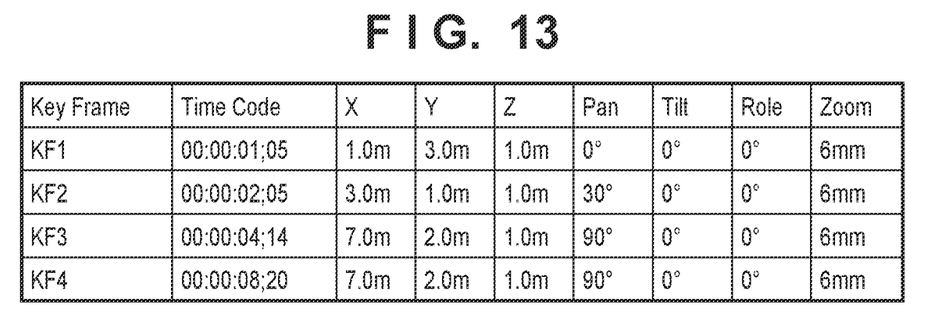
FIG. 13 is a table explaining a setting of a key frame related to the first embodiment.

The key frames indicated in FIG. 13 each include the time code, the X axis, the Y axis and the Z axis that indicate the position of the virtual camera in the three-dimensional space, the three angles of the pan, the tilt and the roll that indicate the orientation of the virtual camera in the three-dimensional space, and the zoom of the virtual camera in the three-dimensional space.

KF1 indicated in FIG. 13 corresponds to the key frame 303 of FIG. 3A, and, similarly, KF2 corresponds to the key frame 304, and KF3 corresponds to the key frame 305. Then, similarly, KF4 corresponds to the key frame 305. Here, KF3 and KF4 have an identical position and identical orientation of a camera, but have different time codes. That is, an intention of a user of keeping the virtual camera still can be read from KF3 and KF4. The virtual camera path 302 of FIG. 3A is a virtual camera path that a user intends to create.

However, the virtual camera path between the set key frames are interpolated by spline interpolation, and thus the virtual camera is not kept still between KF3 and KF4 but returns to an identical position with a smooth motion. Specifically, a trajectory such as a virtual camera path 306 illustrated in FIG. 3B is made. It can be found that although the image clip intended to be created here is to keep the virtual camera still in a last frame and to cause time to elapse, the intention cannot be reflected in the image clip.

Hereinafter, processing for generating a virtual camera path reflecting an intention of a user as illustrated in FIG. 3A will be explained by referring to FIGS. 5 and 6.

Overall Processing

Figure 5:
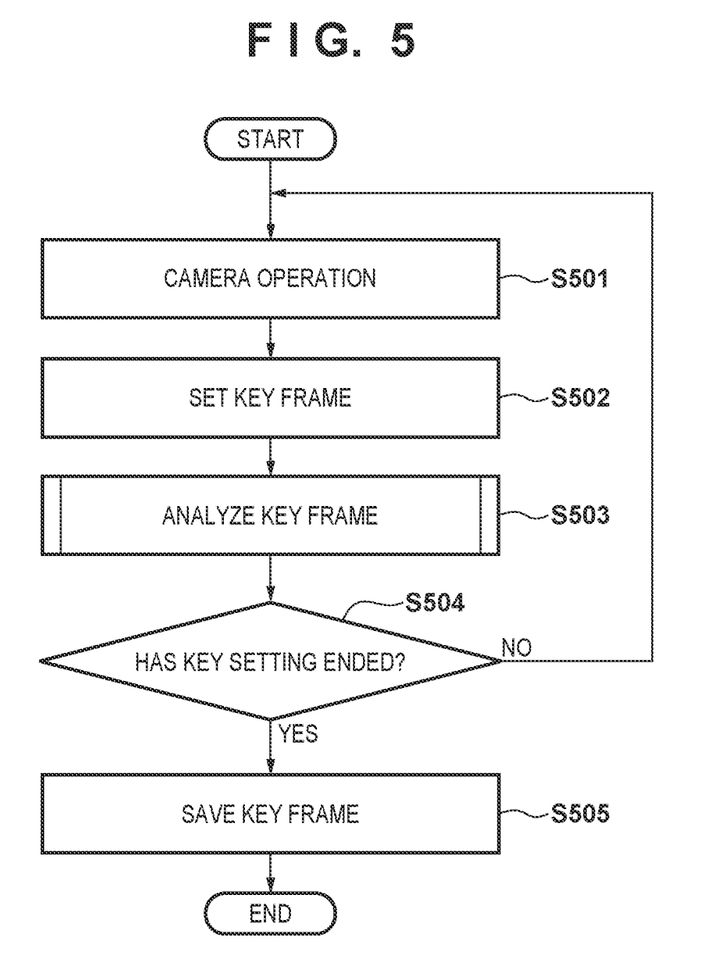
FIG. 5 is a flowchart illustrating a procedure of processing performed by the information processing apparatus related to the first embodiment.

FIG. 5 is a flowchart explaining a procedure of processing performed by the information processing apparatus related to the first embodiment.

At S501, the virtual camera operation unit 202 determines the position and the orientation of the virtual camera in a desired time code, based upon an operation by a virtual camera operator. At S502, the key frame setting unit 203 sets the key frame, based upon the time code, and the position and the orientation of the virtual camera determined at S501.

At S503, the camera path interpolation method determination unit 205 analyzes the key frame set by the key frame setting unit 203, and confirms whether or not the key frame satisfies a predetermined condition. Details of the present step will be described below by referring to FIG. 6.

At S504, the key frame setting unit 203 determines whether or not a setting of the key frame is ended. In a case where a setting of the key frame is ended, the processing proceeds to S505. On the other hand, in a case where a setting of the key frame is not ended, the processing returns to S501 and the processing is repeated. For instance, in a case where completion of a setting of the key frame is input by an operation of the virtual camera operator, it may be determined that a setting of the key frame is ended. However, at least two or more key frames are required to be set. Thus, in a case where one or less key frame is set, the processing may automatically return to S501.

At S505, the key frame saving unit 204 saves the key frame set by the key frame setting unit 203, in accordance with an operation of the virtual camera operator. Accordingly, a sequence of the processing of a sequence of FIG. 5 ends.

Interpolation Method Determination Processing

Figure 6:
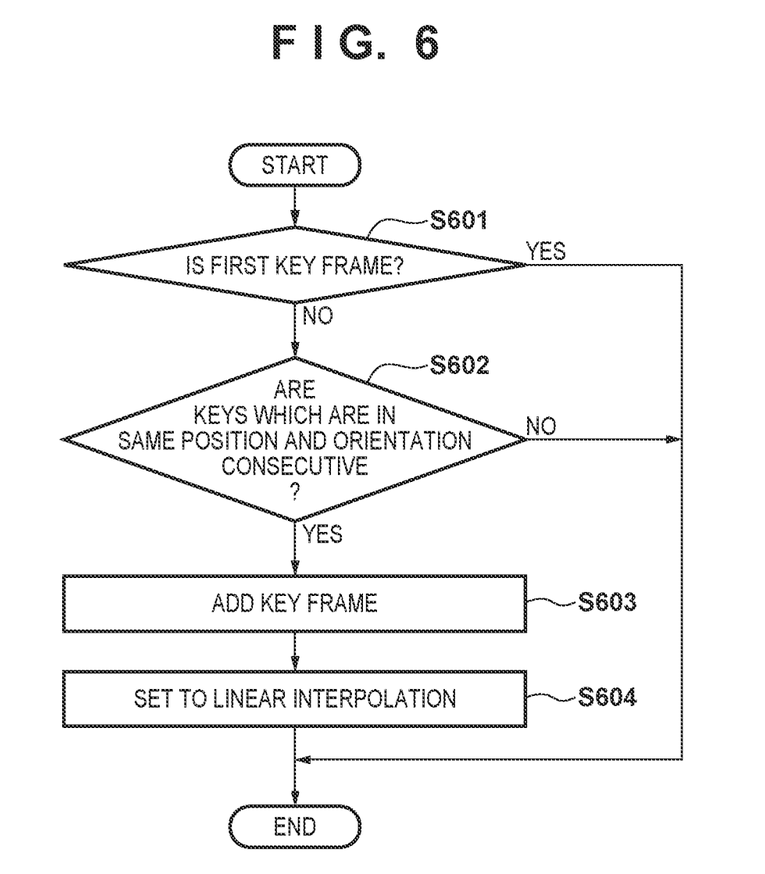
FIG. 6 is a flowchart illustrating a procedure of processing of determining an interpolation method to be performed by the information processing apparatus related to the first embodiment.

Subsequently, FIG. 6 is a flowchart explaining a procedure of processing performed by the information processing apparatus related to the first embodiment. The processing of FIG. 6 is the detailed processing at S503 of FIG. 5.

At S601, the camera path interpolation method determination unit 205 determines whether or not the key frame set by the key frame setting unit 203 is a first key frame. In a case where the key frame set by the key frame setting unit 203 is the first key frame, the processing ends and the processing returns to the flowchart of FIG. 5. On the other hand, in a case where the key frame set by the key frame setting unit 203 is not the first key frame, the processing proceeds to S602.

At S602, the camera path interpolation method determination unit 205 compares an immediately preceding key frame and the key frame of interest. Specifically, it is confirmed whether or not the position and the orientation of the virtual camera of the key frame of interest are identical to the position and the orientation of the virtual camera of the immediately set preceding key frame. In a case where the position and the orientation of the virtual camera of the key frame of interest are different from the position and the orientation of the virtual camera of the immediately set preceding key frame, the processing ends and returns to the flowchart of FIG. 5. On the other hand, the position and the orientation of the virtual camera of the key frame of interest are identical to the position and the orientation of the virtual camera of the immediately set preceding key frame, the processing proceeds to S603.

Figure 14:
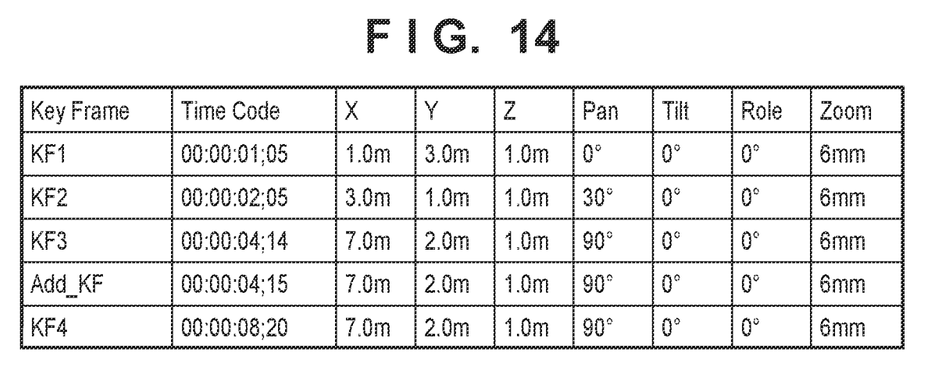
FIG. 14 is a table explaining a setting of a key frame obtained after interpolation method determination related to the first embodiment.

At S603, the camera path interpolation method determination unit 205 adds the key frame. This is to add the key frame having an identical position and identical orientation of the virtual camera and having a time code obtained after the predetermined number of the frames (for instance, one frame), to keep an effect of spline interpolation to a minimum. This key frame addition processing may be performed internally such that a user cannot view the processing. Here, FIG. 14 is a table explaining a setting of the key frame obtained after interpolation method determination related to the first embodiment, and "Add_KF" in FIG. 14 corresponds to this. A position and orientation of Add_KF are identical to the position and the orientation of KF3. Additionally, the time code of KF3 is "00:00:04;14," and indicates a 00-hour, 00-minute and 04.14-second frame. On the other hand, a time code of Add_KF is "00:00:04;15," and indicates a 00-hour, 00-minute and 04.15-second frame. Add_KF is the key frame having the time code obtained by one frame after KF3.

At S604, the camera path interpolation method determination unit 205 sets, to linear interpolation, an interpolation method between the immediately preceding key frame and the key frame added at S603, and an interpolation method between the added key frame and a latest key frame, and saves the interpolation method in the key frame saving unit 204.

KF1, KF2, KF3, Add_KF and KF4 indicated in FIG. 14 become the key frames obtained after interpolation method determination. Note that the added key frame may be processed internally such that a user cannot view the added key frame.

As explained above, according to the present embodiment, an appropriate interpolation method can be applied between the key frames, and thus a virtual camera path reflecting an intention of a user as illustrated in FIG. 3A can be generated.

Second Embodiment

In the present embodiment, an example of performing analysis with respect to a saved key frame and correcting an interpolation method will be explained.

Functional Configuration of Information Processing Apparatus

Figure 7:
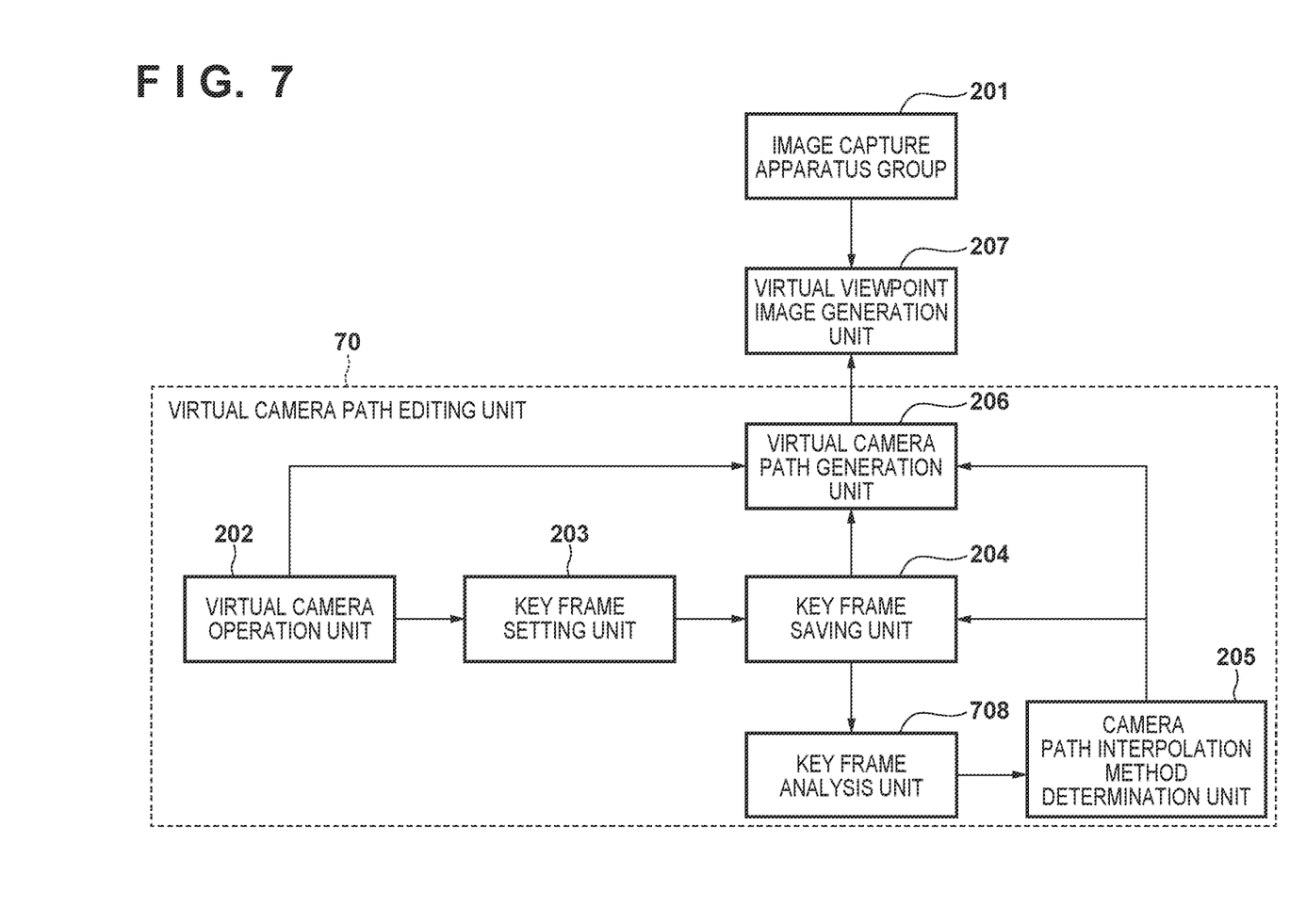
FIG. 7 is a figure illustrating an example of a functional configuration of an information processing apparatus related to a second embodiment.

FIG. 7 is a figure illustrating an example of a functional configuration related to virtual camera path generation of an information processing apparatus 10 related to the present embodiment. Detailed explanation of components identical to the components explained by referring to FIG. 2 will be omitted. Note that a hardware configuration of the information processing apparatus related to the present embodiment is similar to the hardware configuration related to the first embodiment, and thus explanation of the hardware configuration will be omitted. Components of the present embodiment will be explained below by referring to FIG. 7, focusing on a difference from the first embodiment.

The information processing apparatus 10 includes a virtual camera path editing unit 70. The virtual camera path editing unit 70 is provided with a virtual camera operation unit 202, a key frame setting unit 203, a key frame saving unit 204, a camera path interpolation method determination unit 205, a virtual camera path generation unit 206, and a key frame analysis unit 708.

The key frame analysis unit 708 determines whether or not a key frame saved in the key frame saving unit 204 satisfies a predetermined condition, and outputs the determination result to the camera path interpolation method determination unit 205.

Overall Processing

Figure 8:
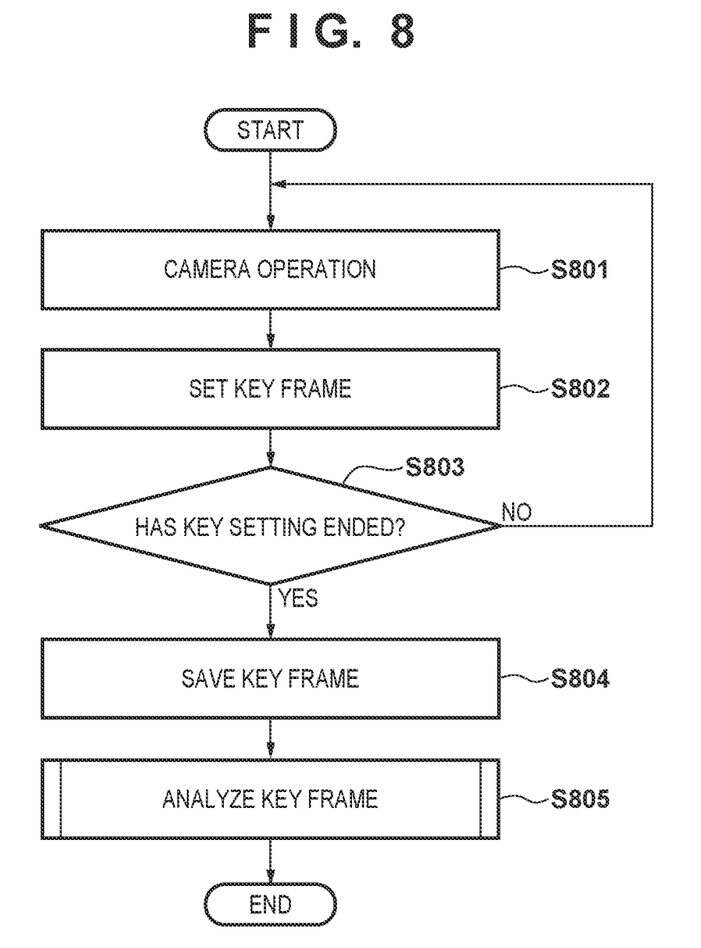
FIG. 8 is a flowchart illustrating a procedure of processing performed by the information processing apparatus related to the second embodiment.

FIG. 8 is a flowchart illustrating a procedure of processing performed by the information processing apparatus related to the second embodiment. S801 to S804 are identical processing to S501, S502, S504 and S505 of FIG. 5, and thus explanation of S801 to S804 will be omitted.

At S805, the key frame analysis unit 708 determines whether or not the key frame saved in the key frame saving unit 204 satisfies a predetermined condition, and outputs the determination result to the camera path interpolation method determination unit 205. Further, the camera path interpolation method determination unit 205 determines an interpolation method. Details will be explained in FIG. 9.

Interpolation Method Determination Processing

Figure 9:
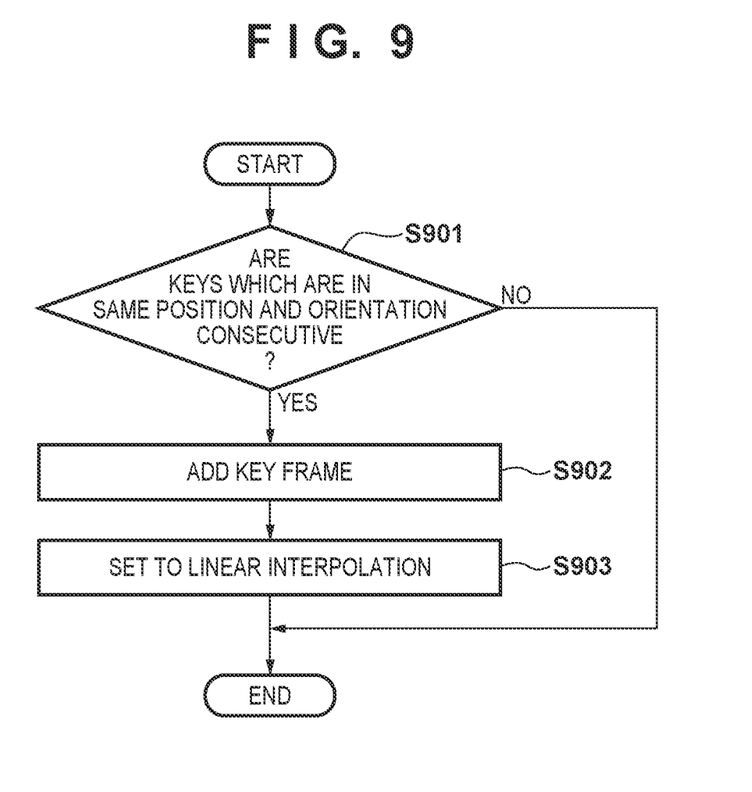
FIG. 9 is a flowchart illustrating a procedure of processing of determining an interpolation method to be performed by the information processing apparatus related to the second embodiment.

FIG. 9 is a flowchart illustrating a procedure of processing performed by the information processing apparatus 10 related to the second embodiment. The processing of FIG. 9 is the detailed processing at S805 of FIG. 8.

At S901, the key frame analysis unit 708 confirms with respect to at least two adjacent key frames among the set key frames whether or not an identical position and identical orientation of a virtual camera exist. In a case where the key frames do not exist, the processing ends and returns to the flowchart of FIG. 8. On the other hand, in a case where the key frames exist, the processing proceeds to S902. Here, the adjacent key frames refer to key frames in which time represented by time information (time code) associated with the key frames is adjacent in time-series. Note that the adjacent key frames are not limited to this, and may be key frames adjacent in order of frames specified by a user.

At S902, the camera path interpolation method determination unit 205 adds a key frame (third key frame) between the two adjacent key frames (a first key frame, and a second key frame) having the identical position and the identical orientation of the virtual camera. For instance, a key frame having the identical position and the identical orientation of the virtual camera and having a time code obtained after the predetermined number of frames (for instance, after one frame) is added to keep an effect of spline interpolation to a minimum. Note that in a case where a plurality of pairs of adjacent key frames having the identical position and the identical orientation of the virtual camera exist, the processing is performed with respect to each of the pairs.

At S903, the camera path interpolation method determination unit 205 determines, as linear interpolation, an interpolation method of a camera path between the first key frame of the two adjacent key frames and the key frame added at S902 (third key frame), and saves the interpolation method in the key frame saving unit 204. Further, an interpolation method of a camera path between the key frame added at S902 (third key frame) and the second key frame of the two adjacent key frames is also determined as linear interpolation, and is similarly saved in the key frame saving unit 204. Additionally, the determined interpolation method is output to the virtual camera path generation unit 206. Note that in a case where a plurality of pairs of adjacent key frames exist, the processing is performed with respect to each of the pairs.

As explained above, according to the present embodiment, a virtual camera path intended by a user can be generated by determining an interpolation method with respect to a camera path obtained after a key frame is saved.

Third Embodiment

In the present embodiment, an example of appropriately determining an interpolation method of a virtual camera path in using a time extension function will be explained.

Explanation of Time Extension Function

When a temporal margin is created before and after an image clip as explained in the first embodiment, in an image clip according to a generated virtual camera path, there is a function to add specified time before and after the virtual camera path.

For instance, it is assumed that reproduction time of an image clip generated based upon a key frame set by a user is 00:00:07;15 (a 7.15-second frame). With respect to this image clip, when time of one second is added before and after the image clip by using a time extension function as measures to create a temporal margin, an image clip of 00:00:09;15 (a 9.15-second frame) is generated. This is a convenient function in creating a temporal margin.

Explanation of Problem

While this time extension function is a convenient function in creating a temporal margin, a problem described below also occurs.

Figure 11:
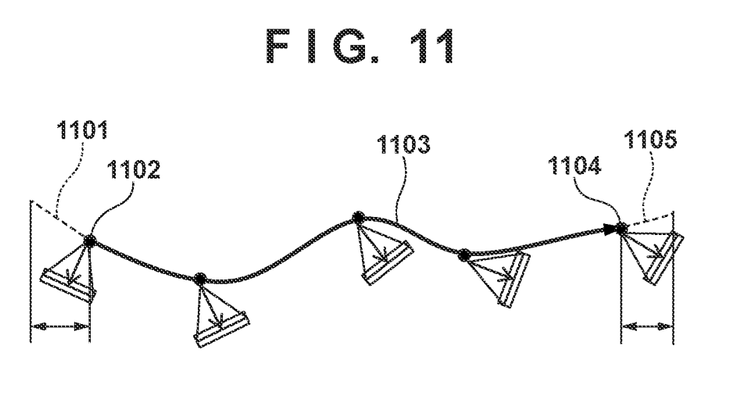
FIG. 11 is a figure explaining a problem related to the third embodiment.

Here, FIG. 11 is a figure explaining a virtual camera path in using the time extension function. A solid line part 1103 is a virtual camera path generated by subjecting set key frames to spline interpolation. A dot 1102 is a first key frame among the set key frames, and a dot 1104 is a last key frame among the set key frames.

Then, a dashed line part 1101 and a dashed line part 1105 are virtual camera paths added by extension time extended by the time extension function. That is, when the time extension function is used, the virtual camera path is disposed on an extension line of spline interpolation, and the time extension is not simple time extension, and may also affect an operation of a virtual camera.

Functional Configuration of Information Processing Apparatus

Figure 10:
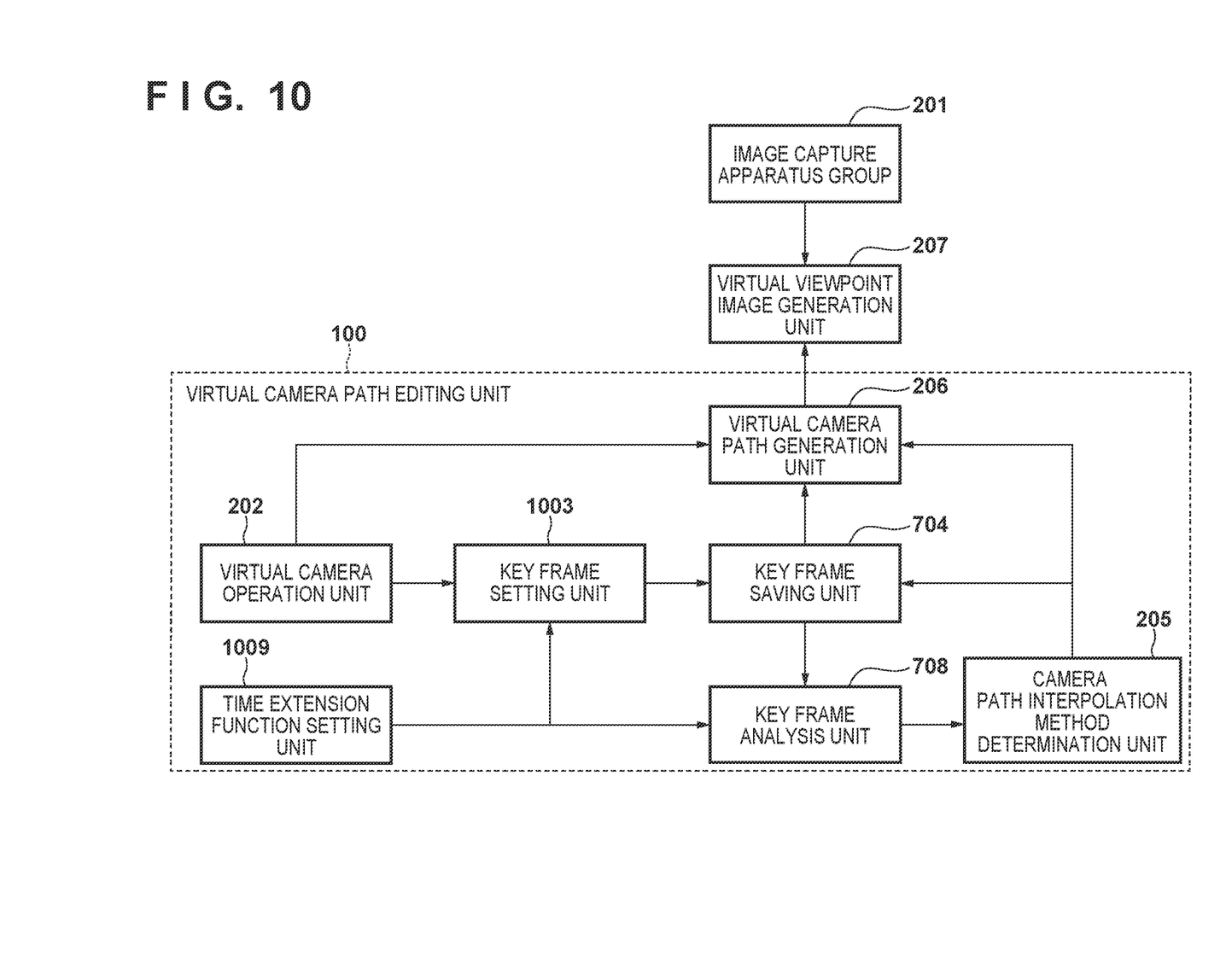
FIG. 10 is a figure illustrating an example of a functional configuration of an information processing apparatus related to a third embodiment.

FIG. 10 is a figure illustrating an example of a functional configuration related to virtual camera path generation of an information processing apparatus 10 related to the present embodiment. Detailed explanation of components identical to the components explained by referring to FIG. 2 will be omitted. Note that a hardware configuration of the information processing apparatus related to the present embodiment is similar to the hardware configuration related to the first embodiment, and thus explanation of the hardware configuration will be omitted. Components of the present embodiment will be explained below by referring to FIG. 10, focusing on a difference from the first embodiment and the second embodiment.

The information processing apparatus 10 includes a virtual camera path editing unit 100. The virtual camera path editing unit 100 is provided with a virtual camera operation unit 202, a key frame setting unit 1003, a key frame saving unit 704, a camera path interpolation method determination unit 205, a virtual camera path generation unit 206, a key frame analysis unit 708, and a time extension function setting unit 1009.

The key frame setting unit 1003 sets a key frame, based upon a virtual camera parameter and key frame setting information (whether or not to set as a key frame) input from the virtual camera operation unit 202, and also adds information set by the time extension function setting unit 1009 to a set key frame and saves the key frame in the key frame saving unit 704.

The time extension function setting unit 1009 sets time to be extended by a virtual camera operator. Note that the time to be extended may be set by setting different time before and after an image clip, or may be set by setting identical time before and after an image clip.

Interpolation Method Determination Processing

Figure 12:
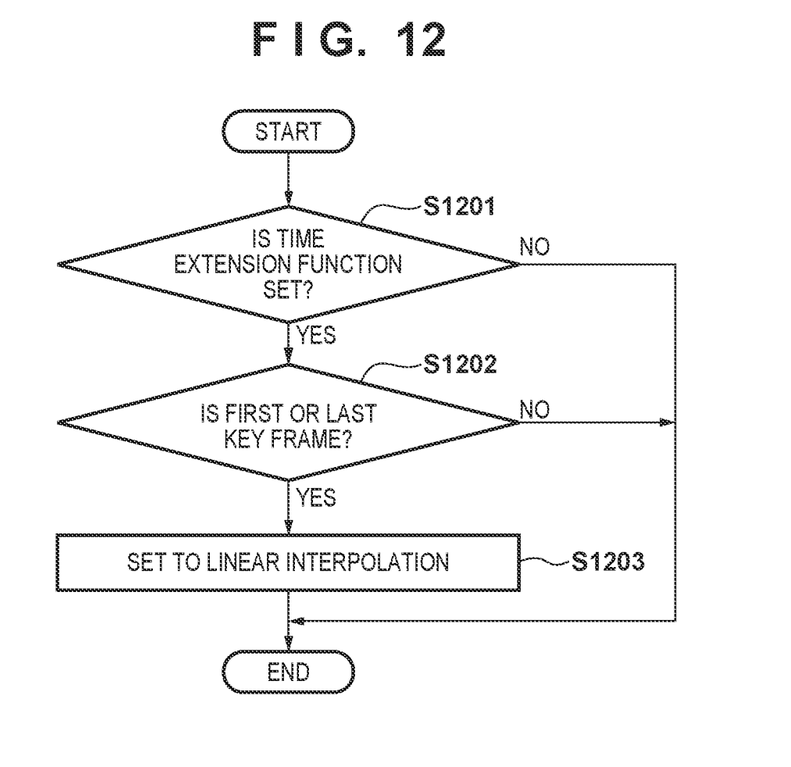
FIG. 12 is a flowchart illustrating a procedure of processing of determining an interpolation method to be performed by the information processing apparatus related to the third embodiment.

FIG. 12 is a flowchart explaining a procedure of processing performed by the information processing apparatus related to the third embodiment. Note that the overall processing procedure is identical to the processing of FIG. 5 explained in the second embodiment, and thus explanation of the processing procedure will be omitted. The processing of FIG. 12 is the detailed processing at S503 of FIG. 5.

At S1201, the key frame analysis unit 708 confirms whether or not the time extension function is set by the time extension function setting unit 1009. In a case where the time extension function is set, the processing proceeds to S1202. On the other hand, in a case where the time extension function is not set, the processing ends.

At S1202, the key frame analysis unit 708 analyzes a set key frame and confirms whether the set key frame is a first key frame or a last key frame. In the case of Yes at the present step, the processing proceeds to S1203. On the other hand, in the case of No at the present step, the processing ends.

At S1203, the camera path interpolation method determination unit 205 sets, to linear interpolation, at least one of an interpolation method between a time-extended part and the first key frame, or an interpolation method between the last key frame and the time-extended part.

As explained above, according to the present embodiment, the virtual camera can be kept still at the beginning and the end of the virtual camera path obtained by using the time extension function.

Additionally, the case where it is intended to dispose the virtual camera on the extension line of spline interpolation is expected according to application, and thus a configuration in which a user can select an interpolation method may be used.

According to the present disclosure, a virtual camera path intended by a user can be generated in virtual camera path generation using a key frame.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-105422, filed Jun. 18, 2020, which is hereby incorporated by reference herein in its entirety.

What is claimed is:

1. An information processing apparatus comprising:
one or more hardware processors; and one or more memories storing one or more programs configured to be executed by the one or more hardware processors, the one or more programs including instructions for:

setting a plurality of key frames each representing a virtual camera parameter including a position and orientation of a virtual camera used for generating a virtual viewpoint image based upon a plurality of captured images obtained by image capture performed by a plurality of image capture apparatuses; and determining, based upon whether a virtual camera parameter of a first key frame and a virtual camera parameter of a second key frame adjacent to the first key frame among the plurality of key frames are identical, an interpolation method of a virtual camera path between the first key frame and the second key frame.

2. The information processing apparatus according to claim 1, wherein the one or more programs further include instructions for:

in a case where the virtual camera parameter of the first key frame and the virtual camera parameter of the second key frame are identical, adding a third key frame between the first key frame and the second key frame after a predetermined number of frames of the first key frame, and determining, as linear interpolation, the interpolation method between the first key frame and the third key frame, and an interpolation method between the third key frame and the second key frame.

3. The information processing apparatus according to claim 2, wherein the predetermined number of frames is one.

4. The information processing apparatus according to claim 1, wherein the one or more programs further include instructions for:

in a case where the virtual camera parameter of the first key frame and the virtual camera parameter of the second key frame are not identical, determining, as spline interpolation, the interpolation method of the virtual camera path between the first key frame and the second key frame.

5. The information processing apparatus according to claim 1, wherein the one or more programs further include instructions for:

saving the plurality of key frames set in the setting;
analyzing the plurality of key frames saved in the saving; and
determining whether or not the virtual camera parameter of the first key frame and the virtual camera parameter of the second key frame are identical, among the plurality of key frames saved in the saving.

6. The information processing apparatus according to claim 1, wherein the virtual camera parameter includes the position and the orientation of the virtual camera, and a time code.

7. The information processing apparatus according to claim 1, wherein the one or more programs further include instructions for:

setting a time-extended part in at least one of before or after a virtual camera path; and
determining the interpolation method, based upon whether or not the time-extended part is set.

8. The information processing apparatus according to claim 7, wherein the one or more programs further include instructions for:

accepting selection of the interpolation method in a case where the time-extended part is set; and
determining an interpolation method of the virtual camera path as the interpolation method selected in the accepting.

9. The information processing apparatus according to claim 7, wherein the one or more programs further include instructions for:

in a case where the time-extended part is set, determining, as linear interpolation, at least one of an interpolation method of a virtual camera path between the first key frame among the plurality of key frames and the time-extended part, or an interpolation method of a virtual camera path between a last key frame among the plurality of key frames and the time-extended part.

10. An information processing method comprising:

setting a plurality of key frames each representing a virtual camera parameter including a position and orientation of a virtual camera; and
determining, based upon whether a virtual camera parameter of a first key frame and a virtual camera parameter of a second key frame adjacent to the first key frame are identical, an interpolation method of a virtual camera path between the first key frame and the second key frame.

11. A non-transitory computer-readable storage medium storing a computer program for causing a computer to execute an information processing method comprising:

setting a plurality of key frames each representing a virtual camera parameter including a position and orientation of a virtual camera; and
determining, based upon whether a virtual camera parameter of a first key frame and a virtual camera parameter of a second key frame adjacent to the first key frame are identical, an interpolation method of a virtual camera path between the first key frame and the second key frame.

* * * * *